(12) United States Patent
Henon et al.

(10) Patent No.: US 9,500,502 B2
(45) Date of Patent: Nov. 22, 2016

(54) DISPLAY INSTRUMENT AND METHOD FOR ASSEMBLING SAME

(71) Applicant: Johnson Controls Automotive Electronics SAS, Cergy-Pontoise (FR)

(72) Inventors: Fabrice Henon, Cergy-Pontoise (FR); Boyan Tzankov, Sofia (BG); Georgi Kolimechkov, Sofia (BG)

(73) Assignee: Johnson Controls Automotive Electronics SAS, Cergy-Pontoise (FR)

( * ) Notice: Subject to any disclaimer, the term of this patent is extended or adjusted under 35 U.S.C. 154(b) by 212 days.

(21) Appl. No.: 14/367,134

(22) PCT Filed: Dec. 21, 2012

(86) PCT No.: PCT/EP2012/076554
§ 371 (c)(1),
(2) Date: Jun. 19, 2014

(87) PCT Pub. No.: WO2013/092954
PCT Pub. Date: Jun. 27, 2013

(65) Prior Publication Data
US 2014/0360424 A1    Dec. 11, 2014

(30) Foreign Application Priority Data

Dec. 21, 2011  (DE) .......................... 10 2011 121 861
Mar. 2, 2012   (EP) ...................................... 12157843

(51) Int. Cl.
*G01D 13/22*  (2006.01)
*G01D 7/00*   (2006.01)
*B60K 37/06*  (2006.01)

(52) U.S. Cl.
CPC ............... *G01D 13/22* (2013.01); *B60K 37/06* (2013.01); *G01D 7/00* (2013.01); *Y10T 29/49826* (2015.01)

(58) Field of Classification Search
CPC ..... G01D 13/22; G01D 13/26; G01D 13/265
USPC ....... 116/284, 286, 287, 288, 294, 297, 328, 116/329, 330, 331, 332, DIG. 6; 362/23.11, 362/23.12, 23.16, 23.17, 23.21
See application file for complete search history.

(56) References Cited

U.S. PATENT DOCUMENTS

| 4,130,358 A | 12/1978 | Lang et al. |
| 5,603,283 A * | 2/1997 | Owen .................... G01D 11/28 116/284 |

(Continued)

FOREIGN PATENT DOCUMENTS

| CA | 866346 A | 3/1971 |
| CN | 86210363 U | 11/1987 |

(Continued)

OTHER PUBLICATIONS

Extended European Search Report issued in corresponding European Application No. 12 157 843.9 dated Sep. 30, 2014.

(Continued)

*Primary Examiner* — R. A. Smith
(74) *Attorney, Agent, or Firm* — Foley & Lardner LLP

(57) ABSTRACT

A display instrument with an indicating scale, includes a pointer element, and a cover element. The pointer element is formed as a two-piece component including a pointer tip and a body, whereby the pointer tip is arranged in such a manner that it is pivotable and/or rotatable with respect to the body. A method of assembling a display instrument is provided.

10 Claims, 4 Drawing Sheets

(56) References Cited

U.S. PATENT DOCUMENTS

| | | | |
|---|---|---|---|
| 5,765,501 A | 6/1998 | Tung et al. | |
| 5,893,875 A | 4/1999 | O'Connor et al. | |
| 8,579,449 B2 * | 11/2013 | Obata | B60K 37/02 |
| | | | 116/48 |
| 2009/0205559 A1 | 8/2009 | Lia et al. | |
| 2010/0154700 A1 | 6/2010 | Cramer et al. | |
| 2011/0203512 A1 | 8/2011 | Baker | |

FOREIGN PATENT DOCUMENTS

| | | | | |
|---|---|---|---|---|
| CN | 2064094 U | 10/1990 | | |
| CN | 2143920 | 10/1993 | | |
| CN | 101637343 A | 2/2010 | | |
| CN | 201909637 U | 7/2011 | | |
| DE | 3435377 A1 * | 9/1985 | | G01D 11/28 |
| DE | 43 21 146 A1 | 1/1995 | | |
| DE | 1020070 24 077 A1 | 9/2008 | | |
| EP | 2 048 479 A1 | 4/2009 | | |
| FR | 2871563 A1 | 12/2005 | | |
| JP | 4218651 B2 * | 2/2009 | | B60K 37/02 |
| JP | 4743655 B2 * | 8/2011 | | B60K 37/02 |
| JP | 5201474 B2 * | 6/2013 | | G01D 13/22 |
| JP | 5267928 B2 * | 8/2013 | | G01D 13/22 |
| WO | WO 2006003274 A1 * | 1/2006 | | B60K 37/02 |

OTHER PUBLICATIONS

Office Action dated Jul. 15, 2015, in corresponding Chinese application No. 201280063264.0, and English translation, 15 pages.
International Search Report in PCT/EP2012/076554, dated Mar. 27, 2013.

* cited by examiner

DISPLAY INSTRUMENT AND METHOD FOR ASSEMBLING SAME

CROSS REFERENCE TO RELATED APPLICATIONS

The present application is a U.S. National Stage of International Application No. PCT/EP2012/076554 filed on Dec. 21, 2012, which claims the benefit of German Patent Application No. 10 2011 121 861.4 filed on Dec. 21, 2011 and European Patent Application No. 12157843.9 tiled on Mar. 2, 2012, the entire disclosures of all of which are incorporated herein by reference.

The invention relates to a display instrument according to the preamble of claim 1. Furthermore, the invention relates to a method for assembling such a display instrument according to the preamble of claim 10

Display instruments in motor vehicles, which comprise at least one display unit for displaying relevant operational data of the motor vehicle, are well known. The relevant operational data can be represented by scales, numerics and/or bar graphs. A combination of a plurality of individual display elements and/or scales into a display instrument is also well known, e.g. as combined displays.

Furthermore, EP 2 048 479 A1 discloses an indicating instrument capable of being assembled with enhanced workability. In the indicating instrument a pointer is extended around the rear of an indicator to the front of an indication panel. A marker part (sign part) capable of positioning the pointer is provided on an instrument case. In assembling of the indicating instrument, a drive member having a drive shaft (pointer shaft) held and fixed to a circuit board with the instrument case as the standard is held and fixed in place, and the needle is press-fitted into the drive shaft (pointer shaft) while the assembling direction of the pointer is being aligned with the marker part (sign part) provided on the instrument case.

It is an object of the present invention to provide an improved display instrument and an improved method for assembling same according to the prior art.

The object is achieved by a display instrument according to claim 1 and by a method according to claim 10.

Preferred embodiments of the invention are given in the dependent claims.

According to the invention, a display instrument with an indicating scale, comprising a pointer element, and a cover element provides that the pointer element is formed as a two-piece component comprising a pointer tip and a body, whereby the pointer tip is arranged in such a manner that it is pivotable and/or rotatable with respect to the body. In particular, the pointer tip is pivotable and/or rotatable from an assembling position to an operating position.

The indicating scale and the cover member are respectively formed as separate components that are arranged on a support plate of the display instrument. Thereby, the indicating scale can display a rotational speed of the engine of the vehicle and/or a coolant temperature, a lubricant temperature or fuel level. As a result of the invention, a simple assembly of the display instrument, in particular the indicating scale and the cover element, is enabled without being affected by the pointer element and the pointer tip.

The pointer tip is arranged in an area of a recess that is formed between the indicating scale and the cover element. The recess preferably corresponds to a movement range of the pointer tip and pointer element along the indicating scale.

In an exemplary embodiment, the pointed tip projects beyond the recess at least section wise. With this, measurement values, e.g. speed of vehicle, are readable in a good way.

In an exemplary embodiment, a pivoting range of the pointer tip between the assembling position and the operating position comprises substantially 90 degrees. With this, a longitudinal adjustment of the pointer tip is aligned corresponding to a longitudinal adjustment of the recess when the pointer tip is retained in the assembling position. At the same time, the longitudinal adjustment of the pointer tip is arranged rectangular with respect to the longitudinal adjustment of the recess when the pointer tip is retained in the operating position. This allows a comfortable assembly of the cover element without being affected by the pointer tip.

In a further embodiment, the pointer tip is substantially drop-shaped and/or formed rounded. Therefore, the pointer element includes a pointed end and a rounded end, by which the pointer element provides a visual attractive design.

The pointer tip and the body are joined together in a non-positive locking, positive locking and/or firmly bonded manner. In particular, the pointer tip and the body are joined together by a bayonet mount that enables a fixed connection that is easy to manufacture.

Further, according to the invention a method for assembling a display instrument comprises that in a first step the indicating scale is assembled, in a second step the pointer element is attached to the indicating scale, in a third step a pointer tip of the pointer element is pivoted and/or rotated from an operating position in to an assembling position relative to a body of the pointer element, in a fourth step a cover element is arranged over the indicating scale and the pointer element and in a fifth step the pointer tip is pivoted and/or rotated from the assembling position in to the operating position relative to the body of the pointer element.

The method according to the invention provides an enhanced assembly of the display instrument related to prior art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

Corresponding parts are marked with the same reference symbols in all figures.

DETAILED DESCRIPTION OF PREFERRED EMBODIMENTS

Figure 1:
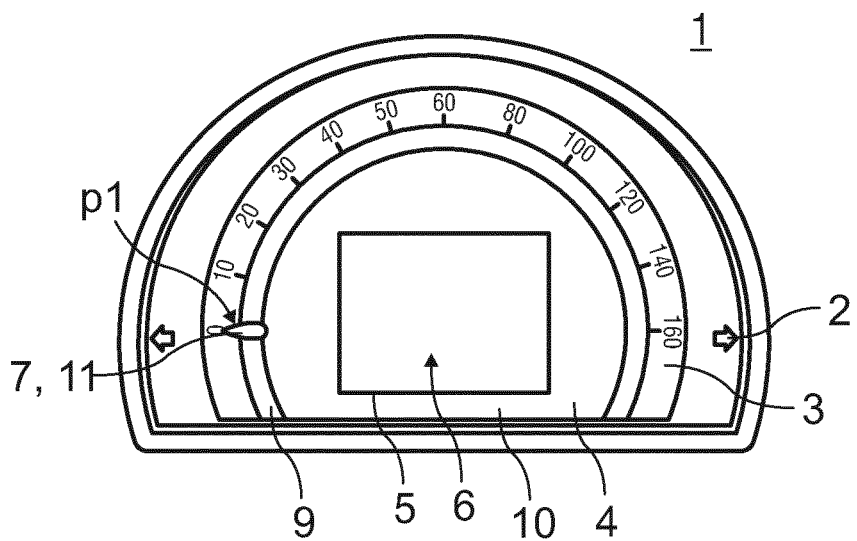
FIG. 1 shows schematically a display instrument of a motor vehicle in accordance with the invention.
Figure 2:
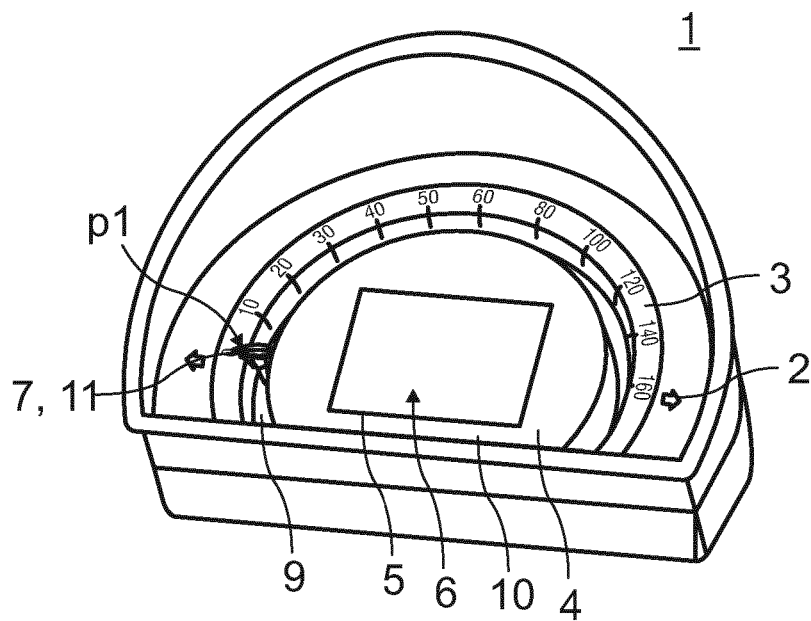
FIG. 2 shows schematically a perspective view of a display instrument in accordance with the invention.
Figure 3:
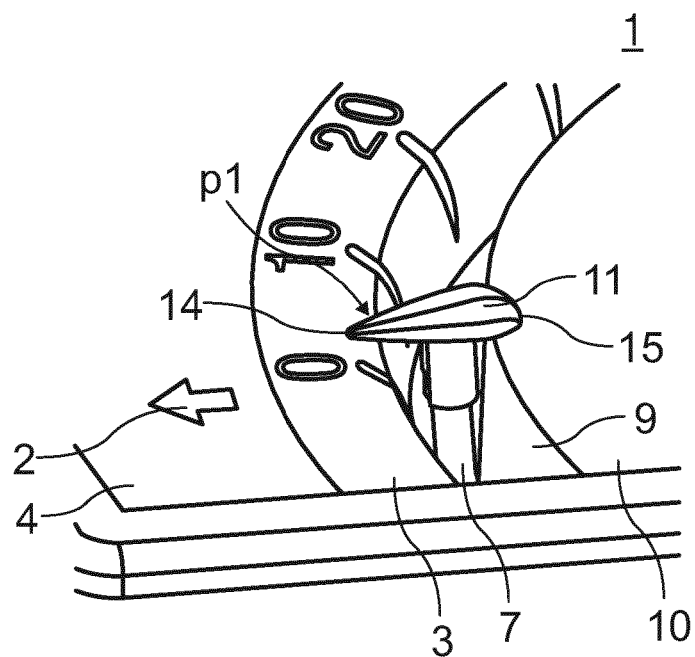
FIG. 3 shows schematically a perspective detailed view of a pointer element with a pointer tip in an operating position, whereby the pointer element is arranged in a recess between an indicating scale and a cover element.
Figure 4:
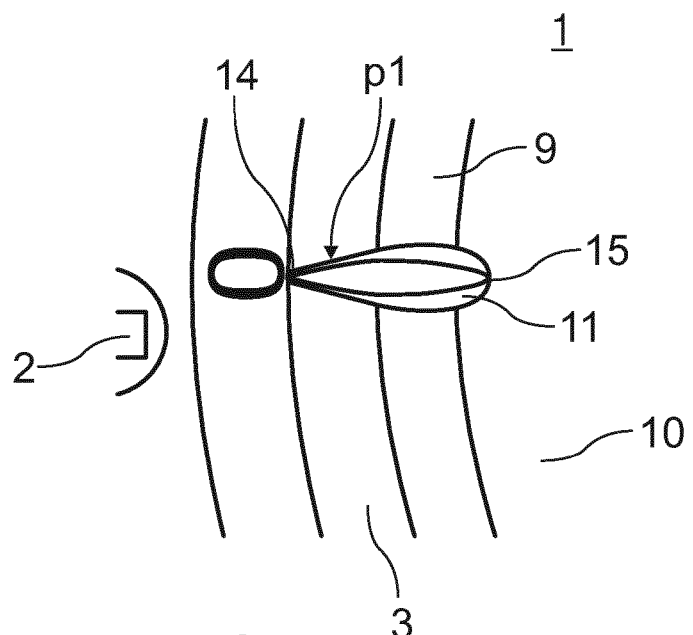
FIG. 4 shows schematically a plan view of the pointer element according to FIG. 3.
Figure 5:
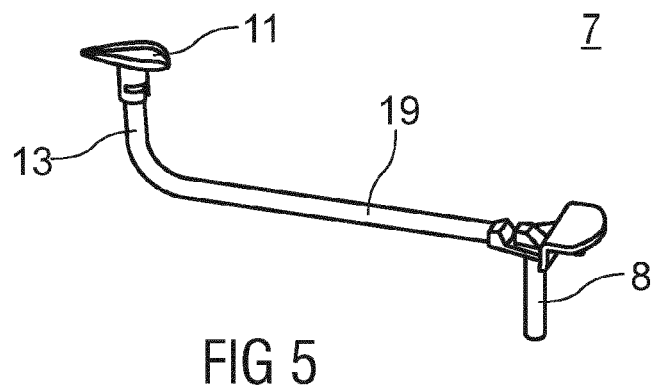
FIG. 5 shows schematically a perspective view of the pointer element with the pointer tip retained in the operating position.

FIG. 1 shows schematically a front view of a display instrument 1 according to the invention for a not shown motor vehicle. FIG. 2 shows schematically a perspective view of the display instrument 1. FIG. 3 shows schematically a perspective detailed view of the pointer element 7 with a pointer tip 11 retained in an operating position p1, whereby the pointer element 7 is arranged in a recess 9 between an indicating scale 3 and a cover element 10. FIG. 4 shows schematically a plan view of the pointer element 7 according to FIG. 3. FIG. 5 shows schematically a perspective detailed view of the pointer element 7 with the pointer tip 11 retained in the operating position p1.

The display instrument 1 illustrated in the present embodiment is formed by a plurality of single display elements 2 and/or indicating scales 3 that are directly inserted into a support plate 4 or alternatively arranged on the support plate 4.

Furthermore, the support plate 4 comprises at least one opening 5 correspondingly designed to a screen 6 that is part of the display instrument and that is arranged in the area of the opening 5. Such screen 6 is preferably formed as a conventional liquid crystal display (LCD).

The display elements 2 and indicating scales 3 display relevant data, e.g. parameters, control- and/or regulating variables, warnings, for vehicle use and/or for operation of a vehicle assistant system and/or entertainment system in a conventional way.

Thereby, the geometric shape and the arrangement of the opening 5 are variably positionable in the support plate 4 and thus easily adaptable to the requirements of different display instruments 1.

The indicating scale 3 is preferably formed as a part circle and centrally arranged in a middle area of the support plate 4 and hence the display instrument 1. In the present illustrated embodiment of the invention, the indicating scale 3 is designed as an analogue display element of a conventional speed indicator. The indicating scale 3 comprises a pointer element 7 that is moved along the indicating scale 3 dependent on a value to display in such a manner that in reference with a pivotal movement of the pointer element 7 along the indicating scale 3 about a pointer axis 8 and a resulting angular position of the pointer element 7 a current value of a measure variable, for example speed of vehicle, can be read.

According to alternative embodiments (not shown) these indicating scales 3 can display a rotational speed of the engine of the vehicle and/or a coolant temperature, a lubricant temperature or fuel level.

The indicating scale 3 is coupled to a conventional step motor that is not shown in the present illustrations. The step motor actuates the pivotal movement of the pointer element 7 along the indicating scale 3. The pivotal movement is performed about the pointer axis 8 that is coupled conventionally to the step motor, in particular its output shaft. The coupling can be performed directly or with interposition of a transmission.

The pointer element 7 is preferably made of a semi-transparent and colored plastic or plastic mixture.

The cover member 10 is designed transparent at least section wise and covers the screen 6 and the area 12 within the indicating scale 3 formed as a part-circle.

The indicating scale 3 formed as a part-circle and the corresponding designed cover element 10 are respectively formed as a separate components that are arranged on the support plate 4 in a positive locking and/or non positive locking and/or firmly bonded manner, in particular glued, clipped, welded or pinned, during assembly of the display instrument 1.

As a result the recess 9 is formed both in the support plate 4 and between the indicating scale 3 and the cover element 10. The recess 9 corresponds to a movement range of the pointer tip 11 and pointer element 7 along the indicating scale 3.

The pointer element 7 is designed as a two-piece component comprising the pointer tip 11 and a body 19. The body 19 has a fitting section 13 arranged on an end faced away from the pointer axis 8. The fitting section 13 is angled compared to the remaining pointer element 7. The course of the fitting section 13 corresponds substantially to that of the pointer axis 8.

Figure 6:
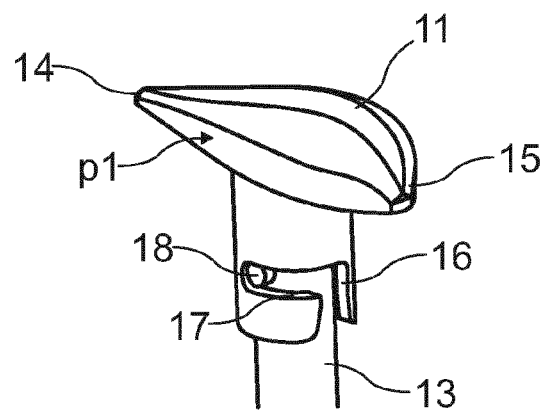
FIG. 6 shows schematically a perspective view of the pointer tip retained in the operating position and arranged on the pointer element.
Figure 7:
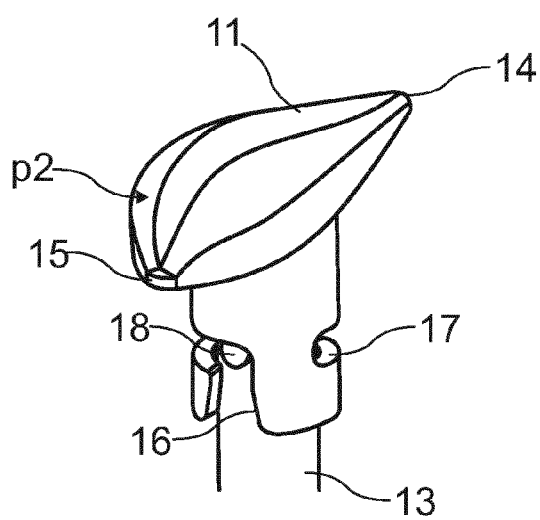
FIG. 7 shows schematically a perspective view of the pointer tip retained in an assembling position and arranged on the pointer element.
Figure 8:
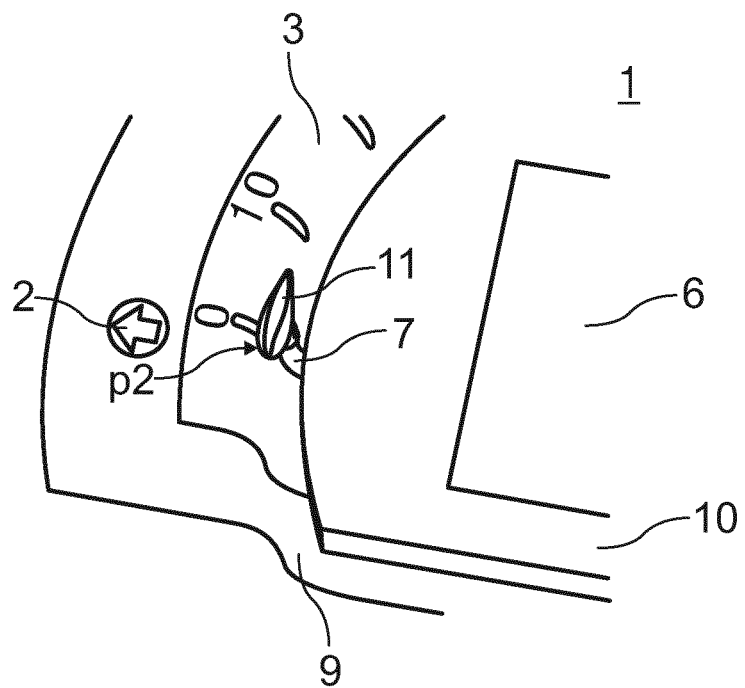
FIG. 8 shows schematically a perspective detailed view of the pointer element with the pointer tip retained in the assembling position, whereby the pointer element is arranged in a recess between the indicating scale and the cover element
Figure 9:
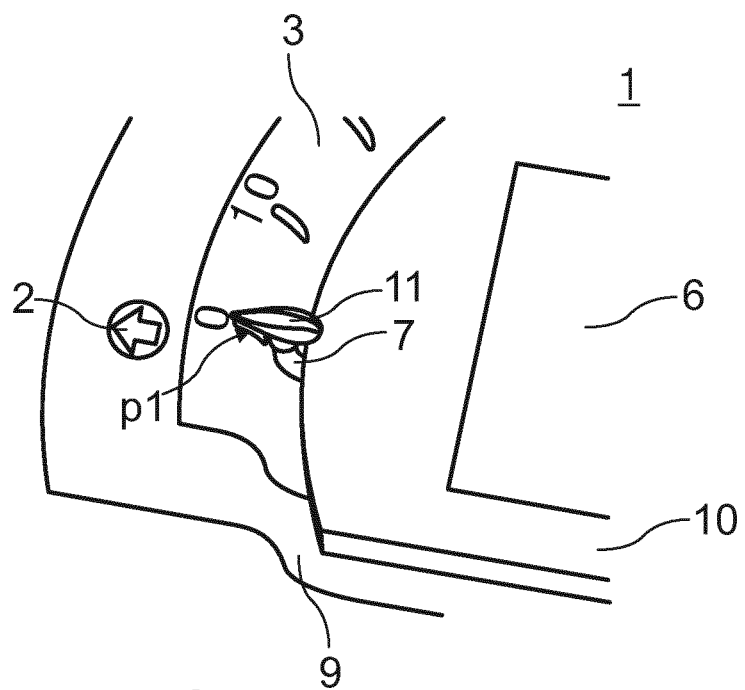
FIG. 9 shows schematically a further perspective detailed view of the pointer element with a pointer tip retained in the operating position, whereby the pointer element is arranged in the recess between the indicating scale and the cover element.

FIG. 6 shows schematically a perspective view of the pointer tip 11 retained in the operating position p1 and arranged on the pointer element 7. FIG. 7 shows schematically a perspective view of the pointer tip 11 retained in an assembling position p2 and arranged on the pointer element 7. FIG. 8 shows schematically a perspective view of the pointer element 7 with the pointer tip 11 retained in the assembling position p2, whereby the pointer element 7 is arranged in the recess 9 between the indicating scale 3 and the cover element 10. FIG. 9 shows schematically a perspective detailed view of the pointer element 7 with the pointer tip 11 retained in the operating position p1, whereby the pointer element 7 is arranged in the recess 9 between the indicating scale 3 and the cover element 10.

The pointer tip 11 is arranged rotatable and/or pivotable on the fitting section 13. Thereby, the pointer tip 11 is substantially drop-shaped and/or formed rounded and comprises a pointed end 14 and a rounded end 15 according to a longitudinal adjustment.

When the pointer tip 11 is in use it is arranged in the area of the recess 9 in the display instrument 1. With this, the pointer tip 11 projects beyond the recess 9 at least section-wise, whereby the pointed end 14 points towards the indicating scale 3.

When the pointer tip 11 is retained in the assembling position p2, the longitudinal adjustment of the pointer tip 11 corresponds to the longitudinal adjustment of the recess 9.

After pivoting the pointer tip 11 from the assembling position p2 in to the operating position p1 relative to the body 19, the longitudinal adjustment of the pointer tip 11 corresponds to the transverse adjustment of the recess 9.

A pivoting range between the pointer tip 11 and the body 19 includes preferably 90 degrees.

Furthermore, the pointer tip 11 and the body 19 are joined to each other in a positive locking and/or non positive locking and/or firmly bonded manner, in particular by a conventional bayonet connection.

A bayonet connection is a fastening mechanism consisting of two cylindrical components locked together. The two components, here the pointer tip 11 and the body 19, are designed corresponding to each other in such a manner that they are connected by plugging into another and opposite rotation. This connection can be disengaged by an opposite movement as described above.

For this type of connection, the pointer tip 11 is designed as a female component comprising a matching L-shaped slot, in particular an elongated slot 16 and a following horizontal slot 17 that is right angled with respect to the elongated slot 16. A length of the horizontal slot 17 defines a pivoting range between the pointer tip 11 and the body 19.

As a result, the body 19 is designed as a male component comprising a radial pin 18 that is aligned with the slots 16, 17. For coupling the two components the pointer tip 11 is pushed over the body 19, whereby the radial pin 18 is introduced into the elongated slot 16. Once the radial pin 18 reaches the end of the elongated slot 16, one of the components, i.e. the body 19 and the pointer tip 11, or both rotate so that the radial pin 18 slides along the horizontal slot 17 until its end. This causes a transition of the pointer tip 11 from the assembling position p2 in to the operating position p1.

With this, a very fixed connection between the body 19 and the pointer tip 11 is realized. Further, this type of fitting can be made faster than screw connections, more securely than push-fit connections and it is more resistant to vibrations.

Preferably, the body 19 and pointer tip 11 are supplied pre-assembled. In this way, a simple assembly of the display instrument 1, in particular the indicating scale 3 and cover element 10, is enabled without damage of the whole pointer element 7 and/or the body 19 and/or the pointer tip 11.

LIST OF REFERENCES

1 Display instrument
2 display element
3 indicating scale
4 support plate
5 opening
6 screen
7 pointer element
8 pointer axis
9 recess
10 cover element
11 pointer tip
12 area
13 fitting section
14 pointed end
15 rounded end
16 elongated slot
17 horizontal slot
18 radial pin
19 body
p1 operating position
p2 assembling position

The invention claimed is:

1. A display instrument with an indicating scale, comprising:
   a pointer element; and
   a cover element;
   wherein the pointer element is formed as a two-piece component comprising a pointer tip and a body, whereby the pointer tip is arranged in such a manner that it is pivotable and/or rotatable with respect to the body in a plane parallel to the cover element while the pointer tip and the body are mechanically interconnected.

2. A display instrument according to claim 1, wherein the pointer tip is pivotable and/or rotatable from an assembling position in to an operating position.

3. A display instrument according to claim 2, wherein a pivoting range between the assembling position and the operating position comprises substantially 90 degrees.

4. A display instrument according to claim 1, wherein the pointer tip is arranged in an area of a recess that is formed between the indicating scale and the cover element.

5. A display instrument according to claim 4, wherein the pointer tip projects beyond the recess at least section wise.

6. A display instrument according to claim 5, wherein the pointer tip includes a pointed end and a rounded end.

7. A display instrument according to claim 4, wherein a longitudinal adjustment of the pointer tip is aligned corresponding to a longitudinal adjustment of the recess when the pointer tip is retained in the assembling position.

8. A display instrument according to claim 1, wherein the pointer tip is substantially drop-shaped and/or formed rounded.

9. A display instrument according to claim 1, wherein the pointer tip and the body are joined together in a non-positive locking, positive locking and/or firmly bonded manner.

10. A method for assembling a display instrument according to claim 1, comprising:
    assembling the indicating scale;
    attaching the pointer element to the assembled indicating scale;
    after attaching the pointer element, pivoting and/or rotating the pointer tip of the pointer element from an operating position in to an assembling position relative to the body of the pointer element;
    after pivoting and/or rotating the pointer tip, arranging the cover element over the indicating scale and the pointer element; and
    after arranging the cover element, pivoting and/or rotating the pointer tip from the assembling position in to the operating position relative to the body of the pointer element.

* * * * *